(12) United States Patent
Ryan

(10) Patent No.: US 11,820,271 B1
(45) Date of Patent: Nov. 21, 2023

(54) CUP HOLDER

(71) Applicant: SUBARU CORPORATION, Tokyo (JP)

(72) Inventor: Christopher John Ryan, Van Buren Township, MI (US)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/163,036

(22) Filed: Feb. 1, 2023

(51) Int. Cl.
  *B60N 3/00* (2006.01)
  *B60N 3/10* (2006.01)

(52) U.S. Cl.
  CPC .................................. *B60N 3/108* (2013.01)

(58) Field of Classification Search
  None
  See application file for complete search history.

(56) References Cited

U.S. PATENT DOCUMENTS

| | | | |
|---|---|---|---|
| 7,416,161 B2 | 8/2008 | Shin | |
| 9,718,389 B2* | 8/2017 | Inoue | B60N 3/106 |
| 10,099,594 B2 | 10/2018 | Salinas et al. | |
| 10,252,658 B2 | 4/2019 | Kong | |
| 10,293,732 B2 | 5/2019 | Inoue et al. | |
| 2004/0118860 A1* | 6/2004 | Leopold | B60N 3/106 |
| | | | 220/737 |
| 2005/0274862 A1* | 12/2005 | Takeichi | B60N 3/106 |
| | | | 248/311.2 |
| 2006/0243875 A1* | 11/2006 | Chen | B60N 3/106 |
| | | | 248/311.2 |
| 2010/0200720 A1* | 8/2010 | Kaemmer | B60N 3/106 |
| | | | 248/311.2 |
| 2015/0251582 A1* | 9/2015 | Sawada | B60N 3/101 |
| | | | 220/737 |
| 2016/0106245 A1* | 4/2016 | Sawada | B60N 3/10 |
| | | | 220/737 |
| 2018/0251059 A1* | 9/2018 | Cociuba | B60N 3/108 |

FOREIGN PATENT DOCUMENTS

JP   2008-143294 A   6/2008

\* cited by examiner

*Primary Examiner* — Steven M Marsh
(74) *Attorney, Agent, or Firm* — McDermott Will & Emery LLP

(57) ABSTRACT

Aspects of the subject technology relate to a cup holder. The cup holder includes a base, a cylindrical sidewall extending from the base, a first tab and a second tab coupled to an outer surface of the cylindrical sidewall, a sensor that measures the pressure applied to the first tab, a processor, and an actuator. When no pressure is applied to the first tab, the first tab is fully protracted into the cup holder and the second tab is fully retracted out of the cup holder. When pressure is applied to the first tab, the first tab moves away from a central axis of the cup holder and the second tab moves toward the central axis of the cup holder.

7 Claims, 10 Drawing Sheets

CUP HOLDER

FIELD

The present disclosure generally relates to cup holders, and more particularly to cup holders in vehicles for holding beverage containers.

BACKGROUND

Cup holders allow drivers and passengers of vehicles to store their beverage containers while on the road. Although cup holders in vehicles provide convenience while on the road, when cup holders are mere circular indentations without any supportive structures therein, the motion of the vehicles may induce beverage containers within the cup holders to move leading to spillage or rattling noise. Supportive structures may be provided inside cup holders to prevent such problems, but with continuous changes in design (e.g., size and shape) of beverage containers, it is difficult to provide supportive structures that accommodate the ever-changing design of beverage containers.

SUMMARY

In accordance with various aspects of the subject disclosure, a cup holder includes a base and a cylindrical sidewall extending from the base. The cylindrical sidewall comprises a first slit and a second slit. Further, the cup holder includes a first tab coupled to an outer surface of the cylindrical sidewall. When no pressure is applied to the first tab, the first tab is fully protracted into the cup holder via the first slit such that the first tab protracts into the cup holder for a first tab maximum protraction amount. When a pressure is applied to the first tab due to the cup holder receiving a container, the first tab moves away from a central axis of the cup holder to retract out of the cup holder via the first slit. Also, the cup holder includes a second tab coupled to the outer surface of the cylindrical sidewall. When no force is applied to the first tab, the second tab is fully retracted out of the cup holder via the second slit such that an entirety of the second tab is outside the cup holder. When the pressure is applied to the first tab, the second tab moves toward the central axis of the cup holder via the second slit. Furthermore, the cup holder includes a sensor that measures the pressure applied to the first tab. The cup holder also includes a processor that i) converts the pressure applied to the first tab to a retraction amount of the first tab, and ii) calculates a protraction amount of the second tab by subtracting the retraction amount of the first tab from the first tab maximum protraction amount. The cup holder further includes an actuator that controls the second tab to move toward the central axis of the cup holder for the calculated protraction amount of the second tabs.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1A:
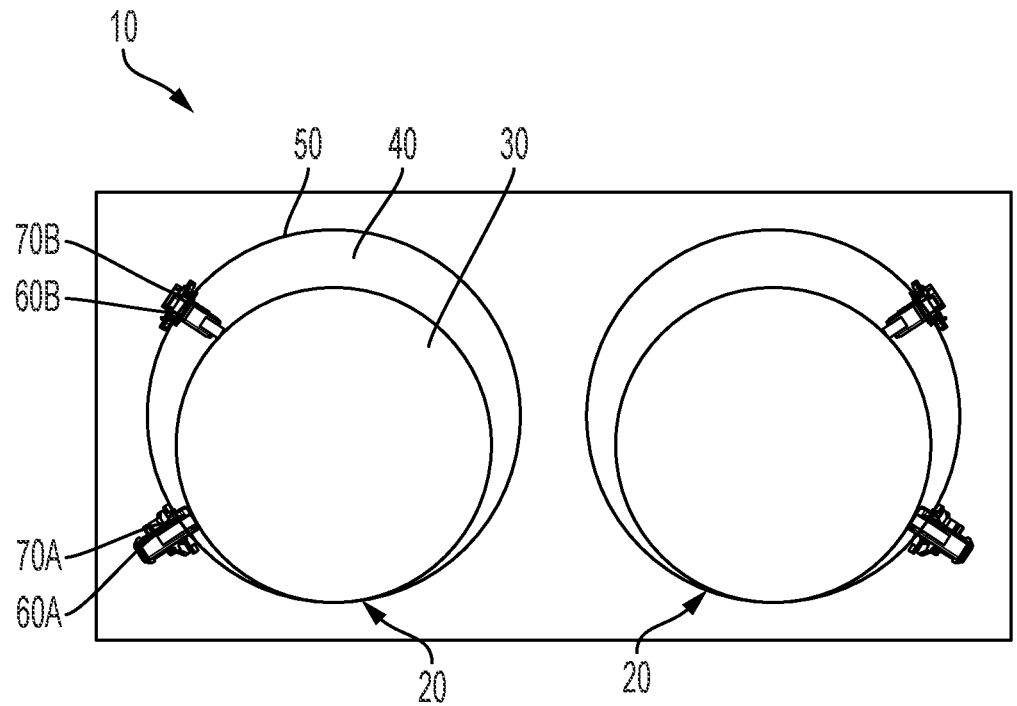
FIGS. 1A and 1B respectively illustrate a plan view and a perspective view of a cup holder assembly according to certain aspects of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

In addition, each of the drawings is a schematic diagram and thus is not necessarily strictly illustrated. In each of the drawings, substantially the same structural components are assigned with the same reference signs, and redundant descriptions will be omitted or simplified.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. For example, while the barricade systems discussed herein may be implemented in many different forms, the disclosure will show in the drawings, and will herein describe in detail, implementations with the understanding that the present description is to be considered as an exemplification of the principles of the selectively-configurable barricade system and is not intended to limit the broad aspects of the disclosure to the implementations illustrated. Accordingly, the drawings and description are to be regarded as illustrative in nature and not restrictive.

Figure 1B:
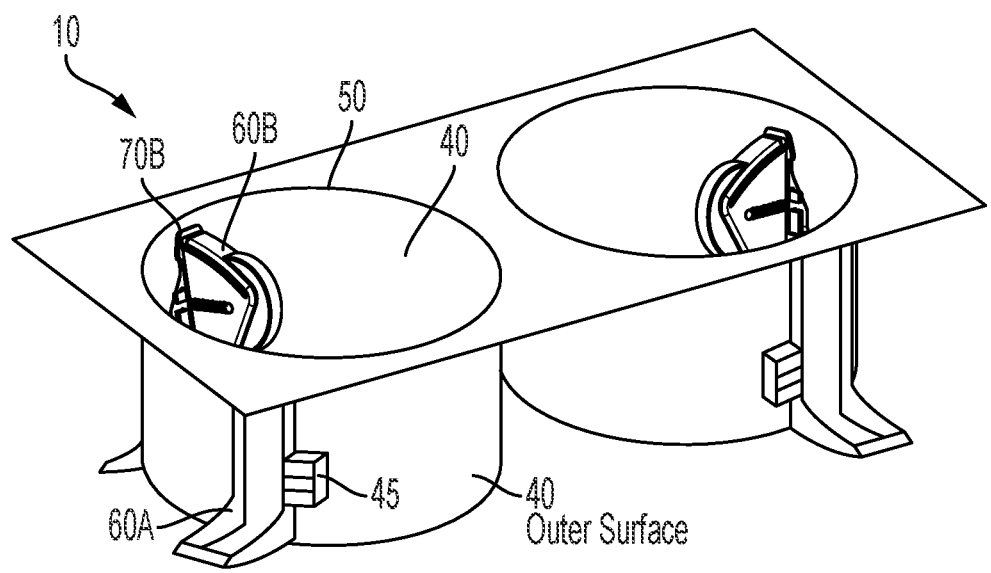

FIGS. 1A and 1B respectively illustrate a plan view and a perspective view of a cup holder assembly 10 according to certain aspects of the disclosure. The cup holder assembly 10 includes first and second cup holders 20. Each of the first and second cup holders 20 includes a base 30 and a cylindrical sidewall 40 extending upward from the base 30. An upper end of the cylindrical sidewall 40 defines an opening 50 of each of the first and second cup holders 20. Each of the first and second cup holders 20 further includes a first tab 60A and a second tab 60B coupled to an outer surface of the cylindrical sidewall 40 by support members 45. The cup holder assembly 10 may have fewer or more than two cup holders.

The cylindrical sidewall 40 includes a first slit 70A and a second slit 70B. The number of slits provided in the cylindrical sidewall 40 may be more than two. The first tab 60A and the second tab 60B are respectively provided to the first slit 70A and the second slit 70B. For example, the first tab 60A and the second tab 60B protract into and retract out of the first cup holder 20 via the first slit 70A and the second slit 70B, respectively.

Figure 2:
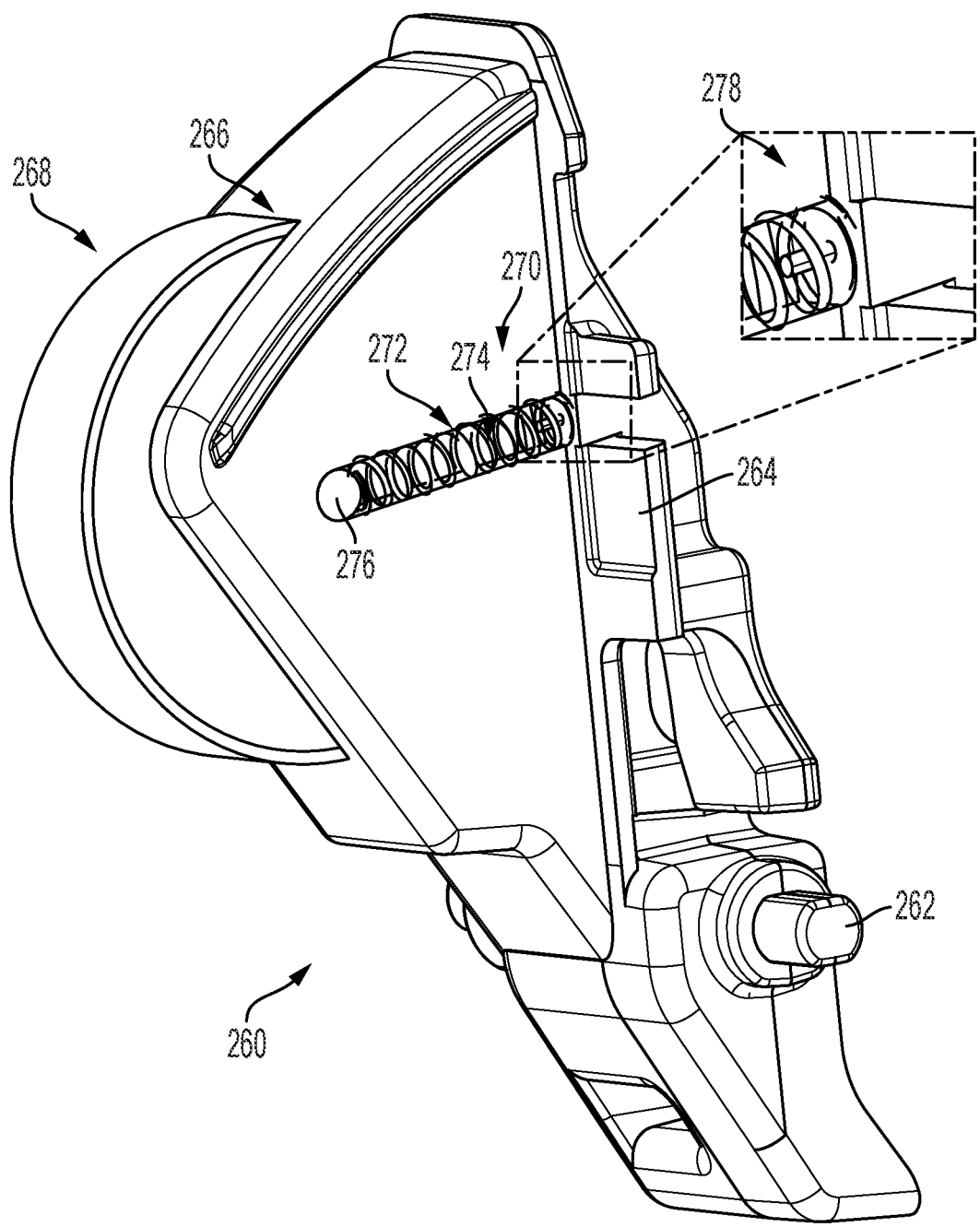
FIG. 2 illustrates a tab of a cup holder according to certain aspects of the disclosure.

FIG. 2 illustrates a tab 260 of a cup holder according to certain aspects of the disclosure. The structure of the first tab 60A and the second tab 60B will be described based on the tab 260. The tab 260 includes hinges 262, a stopper 264, an opening 266, a wheel 268, and a spring assembly 270. The hinge 262 is provided on each side of the tab 260. The hinge 262 on each side of the tab 260 is received by the support members (e.g., support members 45 in FIG. 1B) to allow the tab 260 to be coupled to the cylindrical sidewall (e.g., cylindrical sidewall 40 in FIG. 1A). The stopper 264 abuts to the outer surface of the cylindrical sidewall (e.g., outer surface of 40 in FIG. 1B) when the tab 260 fully protracts into the cup holder (e.g., cup holder 20 in FIG. 1A).

The opening 266 accommodates the wheel 268. The wheel 268 protrudes from the tab 260 via the opening 266. The spring assembly 270 includes a spring slit 272 for accommodating a spring 274 for adjusting a degree of the protrusion of the wheel 268. One end of the spring 274 is fixed to an axis 276 of the wheel 268 while the other end of the spring 274 is fixed to a guide pin 278.

The wheel 268 rotates about the axis 276. For example, when a container is being inserted into a cup holder (e.g., cup holder 20 in FIG. 1A), the wheel 268 rotates toward the base (e.g., base 30 in FIG. 1A) of the cup holder allowing the container to be smoothly inserted into the cup holder. On the other hand, when the container is being pulled out of the cup holder, the wheel 268 rotates away from the base of the cup holder allowing the container to be smoothly pulled out of the cup holder.

Figure 3:
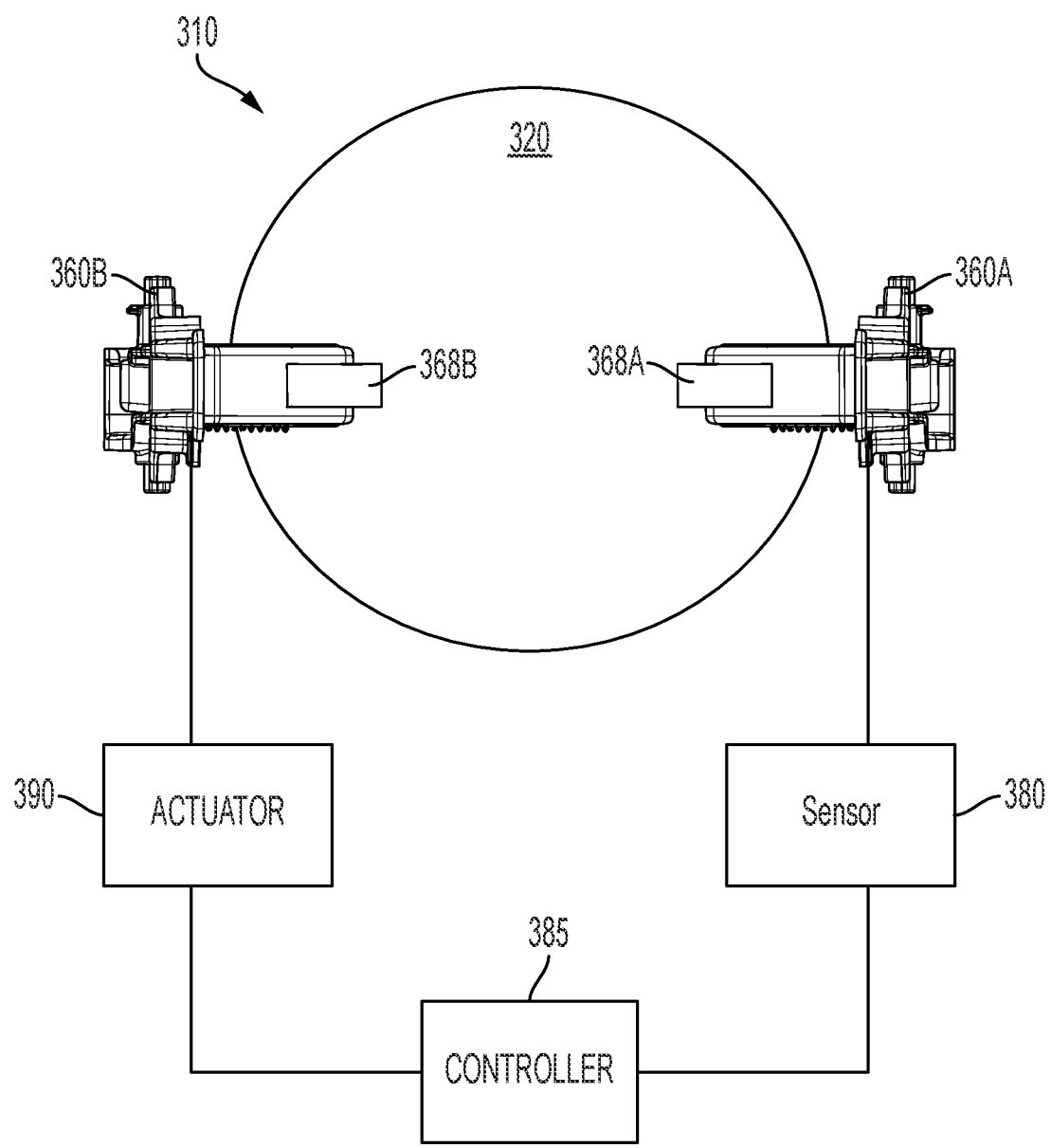
FIG. 3 illustrates a schematic diagram of an example cup holder assembly according to certain aspects of the disclosure.

FIG. 3 illustrates a schematic diagram of an example cup holder assembly 310 according to certain aspects of the disclosure. The cup holder assembly 310 includes a cup holder 320, a first tab 360A, a second tab 360B, a first wheel 368A, a second wheel 368B, a sensor 380, a controller 385, and an actuator 390.

The cup holder 320 includes the first tab 360A and the second tab 360B. The first tab 360A and the second tab 360B respectively house the first wheel 368A and the second wheel 368B. The first tab 360A and the second tab 360B are coupled to the outer surface of the cylindrical sidewall (e.g., outer surface of cylindrical sidewall 40 in FIG. 1B) to protract into and retract out of the cup holder 320 via the first slit and the second slit (e.g., the first slit 70A and the second slit 70B in FIG. 1A) of the cylindrical sidewall (e.g., cylindrical sidewall 40 in FIG. 1A), respectively.

The first tab 360A and the second tab 360B each has a neutral position (i.e., no pressure is applied to the first tab 360A and the second tab 360B) and a pressure-applied position (i.e., pressure is applied to the first tab 360A and the second tab 360B). The first tab 360A and the second tab 360B may be in the neutral position when no container (e.g., beverage container) is inserted in the cup holder 320. The first tab 360A and the second tab 360B may be in the pressure-applied position when a container (e.g., beverage container) is inserted in the cup holder 320. The amount of pressure applied to the first tab 360A and the second tab 360B depends on the circumferential size of the container. The greater the circumference of the container being received by the cup holder 320, the greater the amount of pressure applied to the first tab 360A and the second tab 360B.

When the first tab 360A is in the neutral position, the first tab 360A fully protracts into the cup holder 320 via the first slit (e.g., the first slit 70A in FIG. 1A) such that the first tab 360A protracts into the cup holder 320 for a first tab maximum protraction amount. The first tab maximum protraction amount is the maximum amount the first tab 360A is able to protracts into the cup holder 320. When the second tab 360B is in the neutral position, the second tab 360B fully retracts out of the cup holder 320 via the second slit (e.g., the second slit 70B in FIG. 1A) such that an entirety of the second tab 360B is outside the cup holder 320.

When the cup holder 320 receives a container, a pressure is applied to the first tab 360A in the neutral position (e.g., fully protracted into the cup holder 320) causing the first tab 360A to move away from a central axis of the cup holder to retract out of the cup holder 320. This causes the first tab 360A to be in the pressure-applied position. When the first tab 360A comes into the pressure-applied position from the neutral position, the second tab 360B also comes into the pressure-applied position from the neutral position.

The sensor 380 is connected to the first tab 360A. The sensor 380 measures the pressure applied to the first tab 360A due to, for example, the cup holder 320 receiving the container. The sensor 380 may be a pressure sensor that senses the pressure applied to the first tab 360A. For example, the pressure sensor includes a sensing pad with which a part of the first tab 360A comes in contact. The more pressure applied to the first tab 360A, the more the part of the first tab 360A is pressed against the sensing pad allowing the pressure sensor to measure the pressure applied to the first tab 360A. The sensor 380 then transmits the measured pressure to the controller 385.

The controller 385 receives the measured pressure of the first tab 360A from the sensor 380. Upon receiving the measured pressure, the controller 385 determines a protraction amount of the second tab 360B based on the measured pressure applied to the first tab 360A, and controls the actuator 390 based on the determined protraction amount of the second tab 360B. The controller 385 may represent various forms of processing devices having one or more processors and one or more computer readable media.

The actuator 390 is connected to the second tab 360B. The actuator 390 moves the second tab 360B toward the central axis of the cup holder for the determined protraction amount of the second tab 360B causing the second tab 360B to change from the neutral position to the pressure-applied position. The actuator 390 may include a linear actuator and/or rotary actuator. The processes for changing the second tab 360B from the neutral position to the pressure-applied position will be described using a flowchart of FIG. 4.

Figure 4:
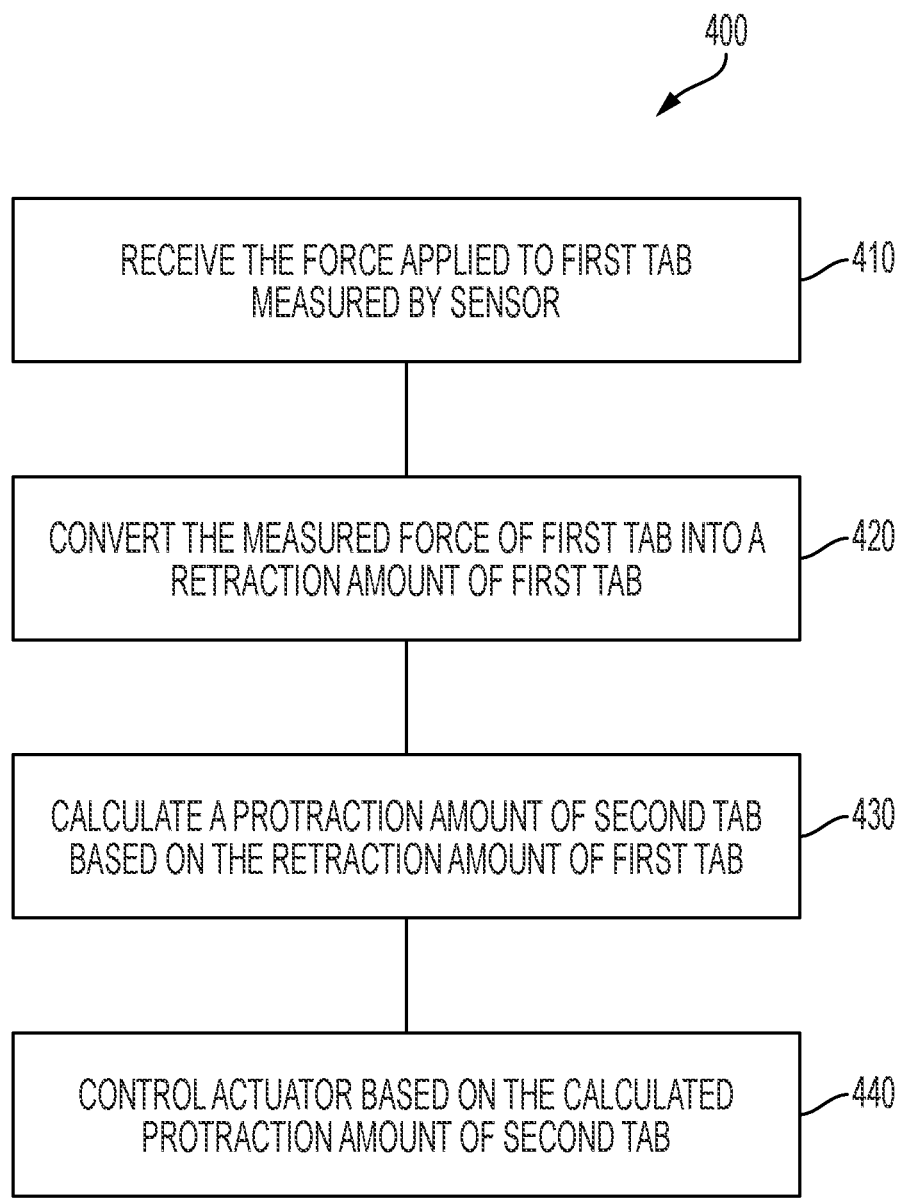
FIG. 4 illustrates an example process to be performed by a controller for controlling an actuator to change the second tab from the neutral position to the pressure-applied position according to example aspects of the subject technology.

FIG. 4 illustrates an example process 400 to be performed by a controller (e.g., controller 385 in FIG. 3) for controlling an actuator (e.g., actuator 390) to change the second tab (e.g., second tab 360B) from the neutral position to the pressure-applied position according to example aspects of the subject technology. For explanatory purposes, the various blocks of the example process 400 are described herein with reference to the components and/or processes described herein. The one or more of the blocks of the process 400 may be implemented, for example, by one or more components or processors of the controller 385 of FIG. 3. In some implementations, one or more of the blocks may be implemented apart from other blocks, and by one or more different processors or controllers. Further, for explanatory purposes, the blocks of the example process 400 are described as occurring in serial, or linearly. However, multiple blocks of the example process 400 may occur in parallel. In addition, the blocks of the example process 400 need not be performed in the order shown and/or one or more of the blocks of the example process 400 need not be performed.

The process 400 begins at block 410 in which the controller 385 receives, from the sensor 380, the pressure applied to the first tab 360A measured by the sensor 380. For example, the sensor 380 periodically measures the pressure applied to the first tab 360A, and transmits the measured pressure to the controller 385. Upon receiving the measured pressure applied to the first tab 360A from the sensor 380, the process 400 proceeds to block 420.

In some embodiments, upon receiving the measured pressure applied to the first tab 360A from the sensor 380, the controller 385 may determine whether the measured pressure is zero (e.g., no pressure applied to the first tab 360A indicating no container is inserted into the cup holder 320) or non-zero (e.g., pressure greater than zero indicating that the container 395 is inserted in the cup holder 320). In response to the controller 385 determining that the pressure applied to the first tab 360A is non-zero, the process 400 proceeds to block 420.

At block 420, the controller 385 converts the measured pressure applied to the first tab 360A into a retraction amount of the first tab 360A. When the cup holder 320 receives a container, the first tab 360A in the neutral position (e.g., fully protracted into the cup holder 320) moves away from the central axis of the cup holder 320 to retract out of the cup holder 320 for a retraction amount. For example, the controller 385 refers to a conversion table for converting the measured pressure into a retraction amount of the first tab 360A. The conversion table, for example, is stored in one of the one or more computer readable media. When the controller 385 converts the measured pressure into a retraction amount of the first tab 360A, the process 400 proceeds to block 430.

At block 430, the controller 385 calculates a protraction amount of the second tab 360B based on the retraction amount of the first tab 360A. The controller 385 calculates the protraction amount of the second tab 360B by subtracting the retraction amount of the first tab 360A from the first tab maximum protraction amount of the first tab 360A. The first tab maximum protraction amount of the first tab 360A may be stored in one of the one or more computer readable media of the controller 385. The controller 385 may look up the first tab maximum protraction amount of the first tab 360A from the one or more computer readable media to use in the calculation of the protraction amount of the second tab 360B. When the controller 385 calculates the protraction amount of the second tab 360B, the process 400 proceeds to block 440.

At block 440, the controller 385 controls the actuator 390 based on the calculated protraction amount of the second tab 360B. For example, the controller 385 transmits a signal to the actuator 390 to allow the actuator 390 to move the second tab 360B toward the central axis of the cup holder 320. The actuator 390 may apply pressure to the second tab 360B to cause the second tab 360B move toward the central axis of the cup holder 320 via the second slit (e.g., the first slit 70B in FIG. 1A) for the calculated protraction amount of the second tab 360B. When the controller 385 completes the control of the actuator 390, the first tab 360A and the second tab 360B are the same distance from the central axis of the cup holder 320. For example, a point of the first tab 360A that is closest to the central axis of the cup holder 320 and a point of the second tab 360B that is closets to the central axis of the cup holder 320 are the same distance from the central axis of the cup holder 320. By allowing the first tab 360A and the second tab 360B to be at the same distance from the central axis of the cup holder, evenly distributed support can be provided to the container inserted in the cupholder 320 leading to improvement in securely holding the container in place while preventing or reducing the rattling noise induced by the vehicle's movement.

In some embodiments, the cup holder assembly (e.g., cup holder assembly 310) may include more than one sensor (e.g., sensor 380) and more than one actuator (e.g., actuator 390). For example, a first sensor and a first actuator are provided to the first tab 360A, and a second sensor and a second actuator are provided to the second tab 360B. After the controller 385 completes controlling the actuator 390 to move the second tab 360B toward the central axis of the cup holder 320 via the second slit 368B for the calculated protraction amount of the second tab 360B, the first sensor of the first tab 360A may re-measure the pressure applied to the first tab 360A, and the second sensor of the second tab 360B may measure the pressure applied to the second tab 360B. The re-measured pressure applied to the first tab 360A and the measured pressure applied to the second tab 360B are fed to the controller 385 from the first sensor and the second sensor.

Upon receiving the re-measured pressure applied to the first tab 360A and the measure pressure applied to the second tab 360B, the controller 385 compares the re-measured pressure applied to the first tab 360A and the measured pressure applied to the second tab 360B to each other. When the re-measured pressure applied to the first tab 360A and the measure pressure applied to the second tab 360B match each other or the difference between the re-measured pressure applied to the first tab 360A and the measured pressure applied to the second tab 360B is within a predetermined range, the controller 385 allows the actuator 390 to maintain the second tab 360B to protract for the calculated retraction amount of the second tab 360B.

When the re-measured pressure applied to the first tab 360A and the measured pressure applied to the second tab 360B do not match each other or the difference between the re-measured pressure applied to the first tab 360A and the measured pressure applied to the second tab 360B are outside a predetermined range, the controller 385 controls either or both of the first actuator and the second actuator such that the re-measured pressure applied to the first tab 360A and the measured pressure applied to the second tab 360B match each other or the difference between the re-measured pressure applied to the first tab 360A and the measured pressure applied to the second tab 360B falls within the predetermined range.

For example, when the re-measured pressure applied to the first tab 360A and the measured pressure applied to the second tab 360B does not match each other or the difference between the re-measured pressure applied to the first tab 360A and the measured pressure applied to the second tab 360B are outside the predetermined range, the controller 385 converts the re-measured pressure applied to the first tab 360A to the retraction amount of the first tab 360A and the measured pressure applied to the second tab 360B to the retraction amount of the second tab 360B. The controller 385 may calculate an average retraction amount by taking an average of the retraction amount of the first tab 360A and the retraction amount of the second tab 360B.

The controller 385 may control the first actuator and the second actuator based on the calculated average retraction amount. For example, the controller 395 causes the first actuator of the first tab 360A to adjust the current retraction amount of the first tab 360A to the newly calculated retraction amount, and causes the second actuator of the second tab 360B to adjust the current retraction amount of the second tab 360B to the newly calculated retraction amount.

The pressures applied to the first tab 360A and the second tab 360B may be periodically checked and adjusted (e.g., every 5 seconds) while the pressure is applied to the first tab 360A. This allows the first tab 360A and the second tab 360B to provide evenly distributed support to the container inserted in the cup holder 320, and allows the container to be placed in the center of the cup holder 320 further allowing the user to smoothly pull the container out of the cup holder 320.

Next, changes in the positions of the first tab 360A and the second tab 360B relative to different pressures applied to the first tab 360A will be described using FIGS. 5A-8B.

Figure 5A:
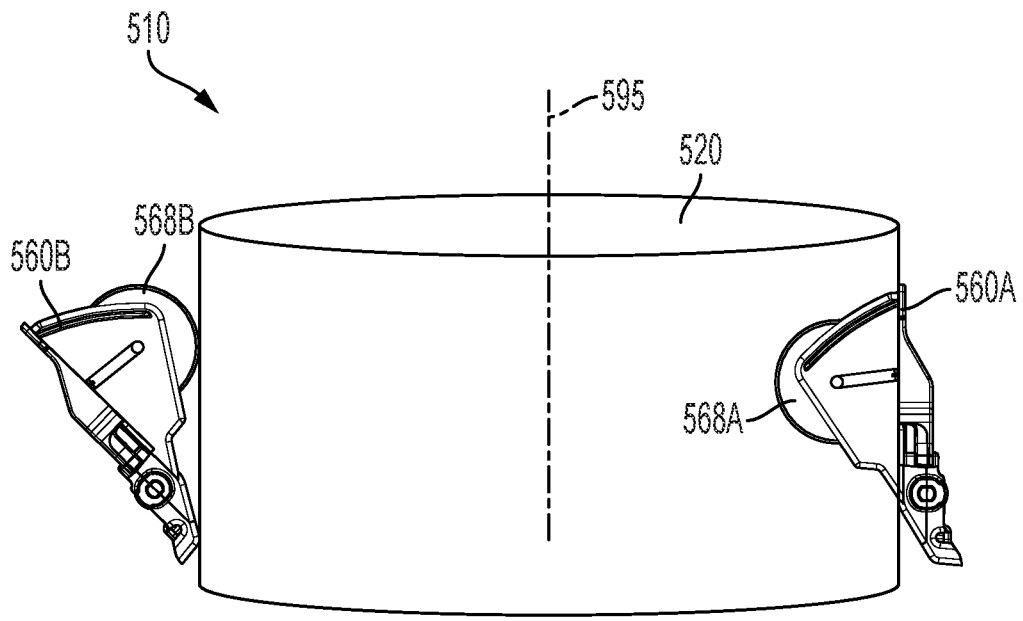
FIGS. 5A and 5B respectively illustrate a cross-sectional view and a plan view of the cup holder assembly when no pressure is applied to the first tab according to certain aspects of the disclosure.
Figure 5B:
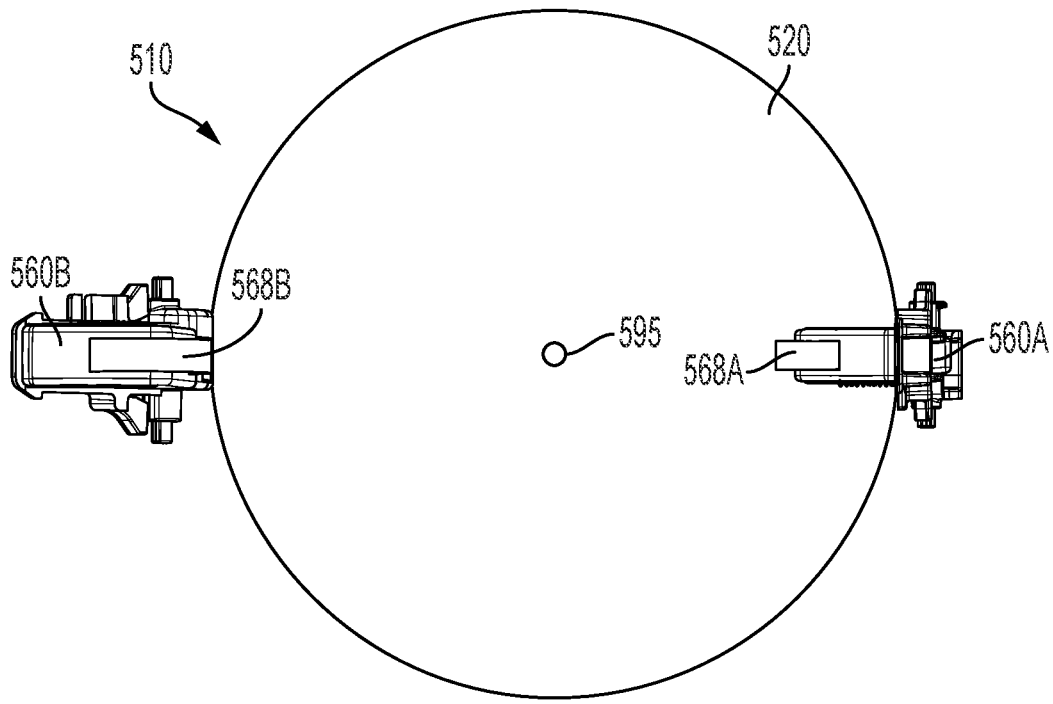

FIGS. 5A and 5B respectively illustrate a cross-sectional view and a plan view of the cup holder assembly 510 when no pressure is applied to the first tab 560A according to certain aspects of the disclosure. When no container is inserted in the cup holder 520, no pressure is applied to the first tab 560A. In other words, the first tab 560A and the second tab 560B are in the neutral position.

In the neutral position, the first tab 560A is fully protracted into the cup holder 520 such that the first tab 560A protracts into the cup holder 520 for the first tab maximum protraction amount. The first tab maximum protraction amount is the maximum amount the first tab 560A is able to protracts into the cup holder 520. The first wheel 568A fully protrudes from the first tab 560A for a maximum protrusion amount toward a central axis 595 of the cup holder 520. The maximum protrusion amount is the maximum amount the first wheel 568A is able to protrudes from the first tab 560A.

In the neutral position, the second tab 560B is fully retracted into the cup holder 520 such that no part of the second tab 560B is in inside the cup holder 520 and the entirety of the second tab 560B together with the fully protruding second wheel 568B is located outside the cup holder 520. Similar to the first wheel 568A of the first tab 560A, when the second tab 560B is in the neutral position, the second wheel 568B fully protrudes from the second tab 560B for the maximum protrusion amount toward the central axis 595 of the cup holder 520. The maximum protrusion amount is the maximum amount the second wheel 568B is able to protrudes from the second tab 560B. The maximum protrusion amounts of the first wheel 568A and the second wheel 568B are the same as each other.

Figure 6A:
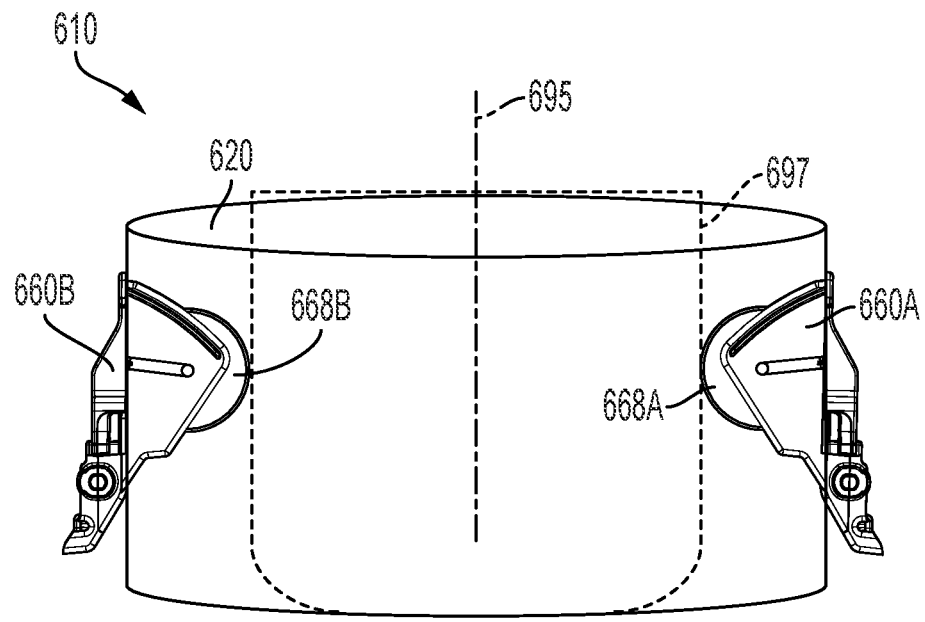
FIGS. 6A and 6B respectively illustrate a cross-sectional view and a plan view of the cup holder assembly when a first pressure is applied to the first tab according to certain aspects of the disclosure.
Figure 6B:
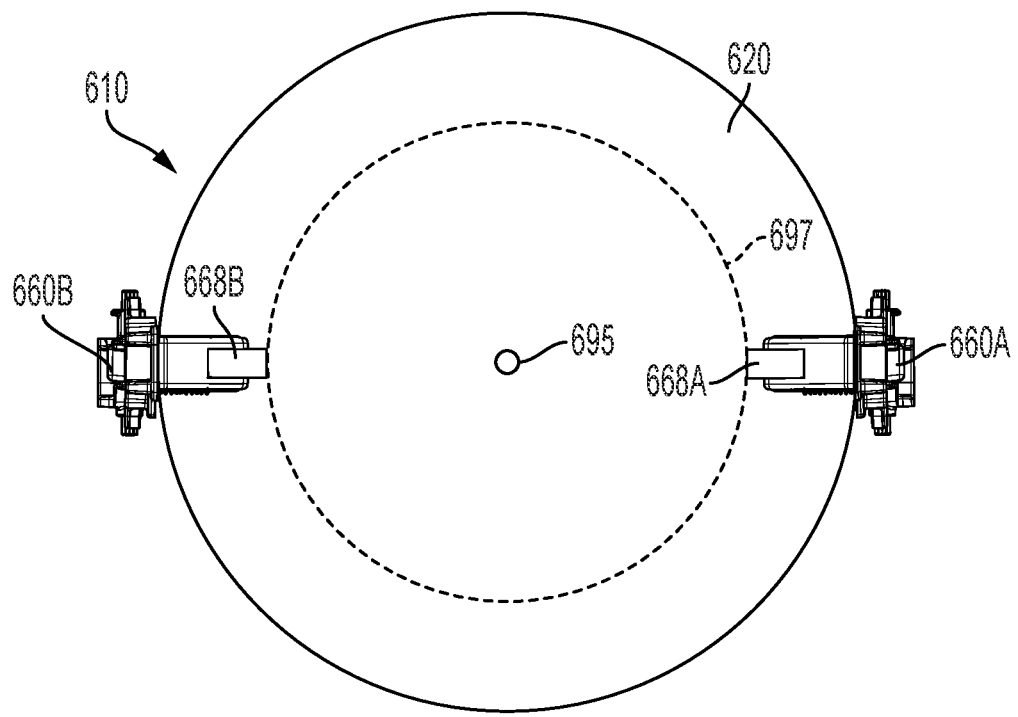

FIGS. 6A and 6B respectively illustrate a cross-sectional view and a plan view of the cup holder assembly 610 when a first pressure is applied to the first tab 660A according to certain aspects of the disclosure. When a first container 697 having a first circumference is inserted in the cup holder 620, the first pressure is applied to the first tab 660A. The first pressure is greater than zero.

When the first pressure is applied to the first tab 660A, the sensor (e.g., sensor 380 in FIG. 3) measures the first pressure and transmits the measured first pressure to the controller (e.g., controller 385 in FIG. 3). The controller converts the first pressure into a first retraction amount of the first tab 660A. The controller calculates a first protraction amount of the second tab 660B by subtracting the first retraction amount of the first tab 660A from the first tab maximum protraction amount. The controller controls the actuator (e.g., actuator 390 in FIG. 3) based on the calculated first protraction amount of the second tab 660B. The actuator moves the second tab 660B toward the central axis 695 of the cup holder 620 for the calculated first protraction amount of the second tab 660B.

As illustrated in FIGS. 6A and 6B, when the first pressure is applied to the first tab 660A, the first tab 660A moves away from the central axis 695 of the cup holder 620 for the first retraction amount of the first tab 660A. For example, when the first pressure is applied to the first tab 660A, a part of the first tab 660A together with at least a part of the fully protruded first wheel 668A is located inside the cup holder 620 while the rest of the first tab 660A together with the rest of the fully protruded first wheel 668A is located outside the cup holder 620.

When the actuator moves the second tab 660B toward the central axis 695 of the cup holder 620 for the first protraction amount of the second tab 660B, the second tab 660B protracts into the cup holder 620 such that a part of the second tab 660B together with at least a part of the fully protruded second wheel 668B is located inside the cup holder 620 and the rest of the second tab 660B is located outside the cup holder 620. Depending on the degree of the pressure applied to the first tab 660A, the rest of the fully protruded first wheel 668B may be located inside the cup holder 620 along with the rest of the second tab 660B.

In some embodiments, when the first tab 660A moves away from the central axis 695 of the cup holder 620 for the first retraction amount of the first tab 660A, the part of the first tab 660A together with the entirety of the fully protruded first wheel 668A is located inside the cup holder 620 while the rest of the first tab 660A is located outside the cup holder 620. When the second tab 660B moves toward the central axis 695 of the cup holder 620 for the first protraction amount of the second tab 660B, the part of the second tab 660B together with the entirety of the fully protruded second wheel 668B is located inside the cup holder 620 while the rest of the second tab 660B is located outside the cup holder 620.

The configuration of the cup holder assembly 610 depicted in FIGS. 6A and 6B allows the first wheel 668A and the second wheel 668B to continuously be in contact with the container 697 providing a smooth operation for the user when the user pulls the container 697 from the cup holder 620 while the container 697 inserted in the cup holder 620 is securely held in place by the first tab 660A and the second tab 660B providing evenly distributed support.

Figure 7A:
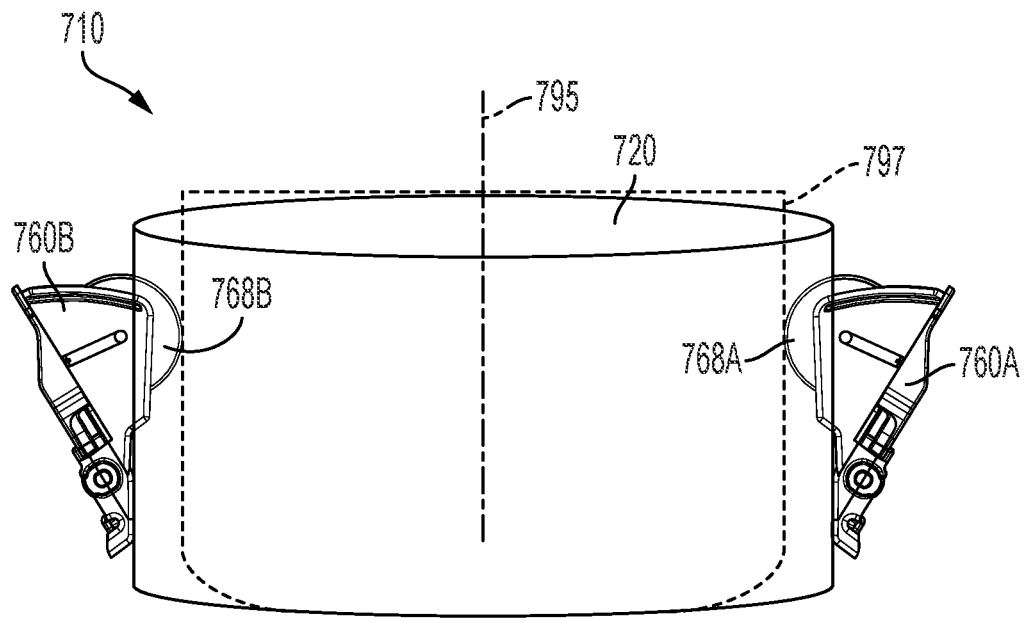
FIGS. 7A and 7B respectively illustrate a cross-sectional view and a plan view of the cup holder assembly when a second pressure is applied to the first tab according to certain aspects of the disclosure.
Figure 7B:
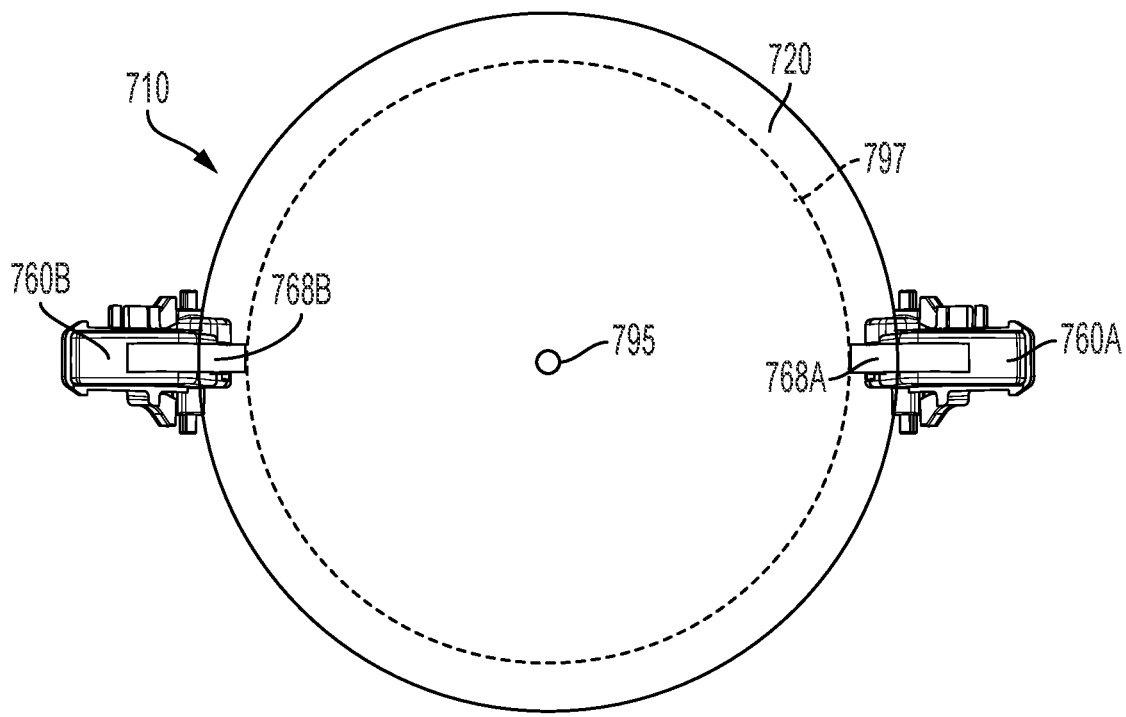

FIGS. 7A and 7B respectively illustrate a cross-sectional view and a plan view of the cup holder assembly 710 when a second pressure is applied to the first tab 760A according to certain aspects of the disclosure. When a second container 797 having a second circumference is inserted in the cup holder 720, the second pressure is applied to the first tab 760A. The second circumference of the second container 797 is larger than the first circumference of the first container 697 of FIGS. 6A and 6B. Thus, the second pressure applied to the first tab 760A in a situation depicted in FIGS. 7A and 7B is greater than the first pressure applied to the first tab 660A in a situation depicted in FIGS. 6A and 6B.

When the second pressure is applied to the first tab 760A, the sensor (e.g., sensor 380 in FIG. 3) measures the second pressure and transmits the measured second pressure to the controller (e.g., controller 385 in FIG. 3). The controller converts the second pressure into a second retraction amount of the first tab 760A. The controller calculates a second protraction amount of the second tab 760B by subtracting the second retraction amount of the first tab 760A from the first tab maximum protraction amount. The controller controls the actuator (e.g., actuator 390 in FIG. 3) based on the calculated second protraction amount of the second tab 760B. The actuator moves the second tab 760B toward the central axis 795 of the cup holder 720 for the calculated second protraction amount of the second tab 760B.

As illustrated in FIGS. 7A and 7B, when the second pressure is applied to the first tab 760A, the first tab 760A moves away from the central axis 795 of the cup holder 720 for the second retraction amount of the first tab 760A such that the entirety of the first tab 760A is located outside the cup holder 720. In some embodiments, when the entirety of the first tab 760A is located outside of the cup holder 720, a point of the first tab 760A that is closest to the central axis 795 of the cup holder 720 becomes even with an inner surface of the cylindrical sidewall (e.g., cylindrical sidewall 40 in FIG. 1A) of the cup holder 720. While the entirety of the first tab 760A is located outside the cup holder 720 when the second pressure is applied to the first tab 760A, the maximum protrusion amount of the fully protruded first wheel 768A is maintained and a part of the fully protruded first wheel 768A is located inside the cup holder 720 while the rest of the fully protruded first wheel 768A is located outside the cup holder 720.

When the actuator moves the second tab 760B toward the central axis 795 of the cup holder 720 for the second protraction amount of the second tab 760B, the entirety of the second tab 760B is located outside the cup holder 720. In some embodiments, when the entirety of the second tab 760B is located outside of the cup holder 720, a point of the second tab 760B that is closest to the central axis 795 of the cup holder 720 becomes even with the inner surface of the cylindrical sidewall of the cup holder 720. While the entirety of the second tab 760B is located outside the cup holder 720 when the second tab 760B moves toward the central axis 795 of the cup holder 720 for the second protraction amount of the second tab 760B, the maximum protrusion amount of the fully protruded second wheel 768B is maintained and a part of the fully protruded second wheel 768B is located inside the cup holder 720 while the rest of the fully protruded second wheel 768B is located outside the cup holder 720.

The configuration of the cup holder assembly 710 depicted in FIGS. 7A and 7B allows the first wheel 768A and the second wheel 768B to continuously be in contact with the container 797 providing a smooth operation for the user when the user pulls the container 797 from the cup holder 720 while the container 797 inserted in the cup holder 720 is securely held in place by the first tab 760A and the second tab 760B providing evenly distributed support.

Figure 8A:
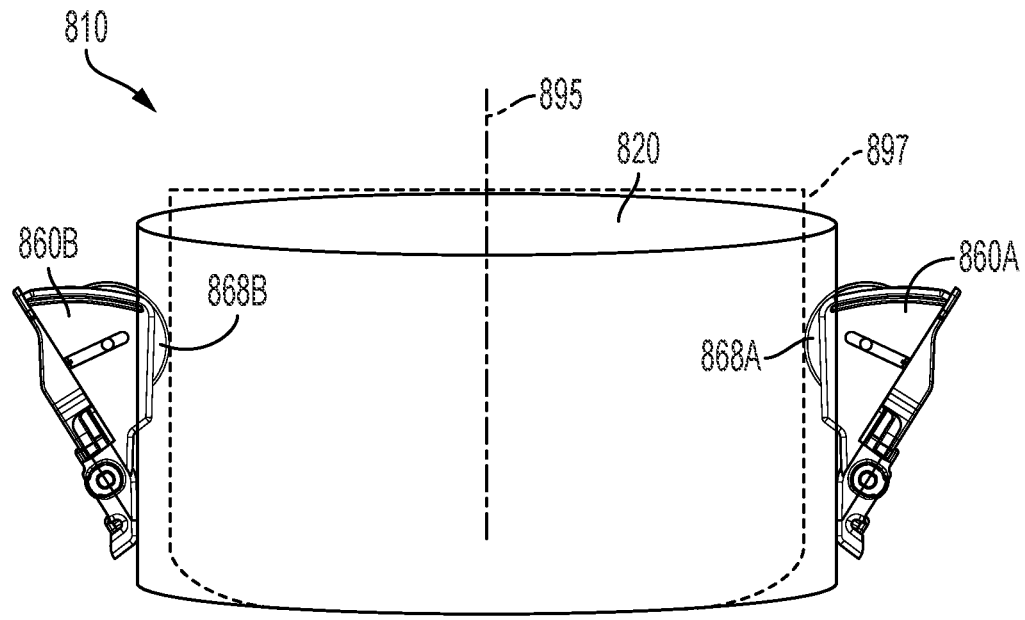
FIGS. 8A and 8B respectively illustrate a cross-sectional view and a plan view of the cup holder assembly when a third pressure is applied to the first tab according to certain aspects of the disclosure.
Figure 8B:
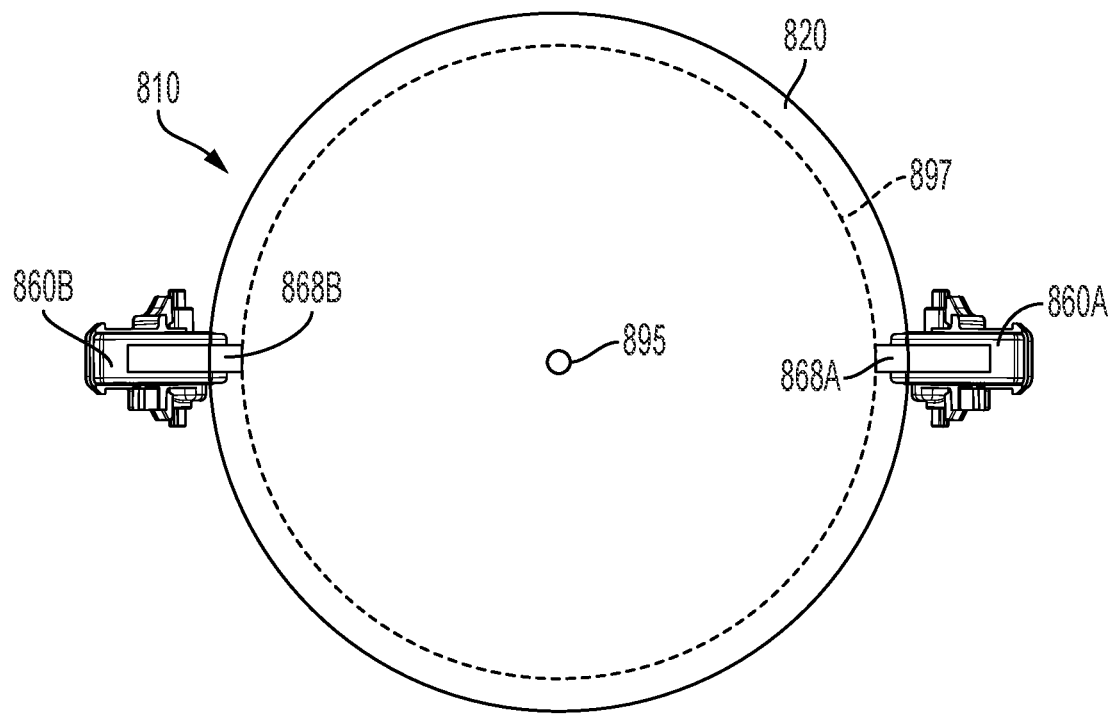

FIGS. 8A and 8B respectively illustrate a cross-sectional view and a plan view of the cup holder assembly 810 when a third pressure is applied to the first tab 860A according to certain aspects of the disclosure. When a third container 897 having a third circumference is inserted in the cup holder 820, the third pressure is applied to the first tab 860A. The third circumference of the third container 897 is larger than the second circumference of the second container 797 of FIGS. 7A and 7B. Thus, the third pressure applied to the first tab 860A in a situation depicted in FIGS. 8A and 8B is greater than the second pressure applied to the first tab 760A in a situation depicted in FIGS. 7A and 7B.

When the third pressure is applied to the first tab 860A, the sensor (e.g., sensor 380 in FIG. 3) measures the third pressure and transmits the measured third pressure to the controller (e.g., controller 385 in FIG. 3). The controller converts the third pressure into a third retraction amount of the first tab 860A. The controller calculates a third protraction amount of the second tab 860B by subtracting the third retraction amount of the first tab 860A from the first tab maximum protraction amount. The controller controls the actuator (e.g., actuator 390 in FIG. 3) based on the calculated third protraction amount of the second tab 860B. The actuator moves the second tab 860B toward the central axis 895 of the cup holder 820 for the calculated third protraction amount of the second tab 860B.

As illustrated in FIGS. 8A and 8B, when the third pressure is applied to the first tab 860A, the first tab 860A moves away from the central axis 895 of the cup holder 820 for the third retraction amount of the first tab 860A such that the entirety of the first tab 860A is located outside the cup holder 820. In some embodiments, when the entirety of the first tab 860A is located outside of the cup holder 820, a point of the first tab 860A that is closest to the central axis 895 of the cup holder 820 becomes even with the inner surface of the cylindrical sidewall (e.g., cylindrical sidewall 40 in FIG. 1A) of the cup holder 820. While the entirety of the first tab 860A is located outside the cup holder 820 when the third pressure is applied to the first tab 860A, a part of the first wheel 868A that is not fully protruded from the first tab 860A is located outside the cup holder 820 while the rest of the first wheel 868A that is not fully protruded from the first tab 860A is located inside the cup holder 820.

When the actuator moves the second tab 860B toward the central axis 895 of the cup holder 820 for the third protraction amount of the second tab 860B, the entirety of the second tab 860B is located outside the cup holder 820. In some embodiments, when the entirety of the second tab 860B is located outside of the cup holder 820, a point of the second tab 860B that is closest to the central axis 895 of the cup holder 820 becomes even with the inner surface of the cylindrical sidewall of the cup holder 820. While the entirety of the second tab 860B is located outside the cup holder 820 when the second tab 860B moves toward the central axis 895 of the cup holder 820 for the third protraction amount of the second tab 860B, a part of the second wheel 868B that is not fully protruded from the second tab 860B is located outside the cup holder 820 while the rest of the second wheel 868B that is not fully protruded is located inside the cup holder 820.

The configuration of the cup holder assembly 810 depicted in FIGS. 8A and 8B allows the first wheel 868A and the second wheel 868B to continuously be in contact with the container 897 providing a smooth operation for the user when the user pulls the container 897 from the cup holder 820 while the container 897 inserted in the cup holder 820 is securely held in place by the first tab 860A and the second tab 860B providing evenly distributed support.

Figure 9A:
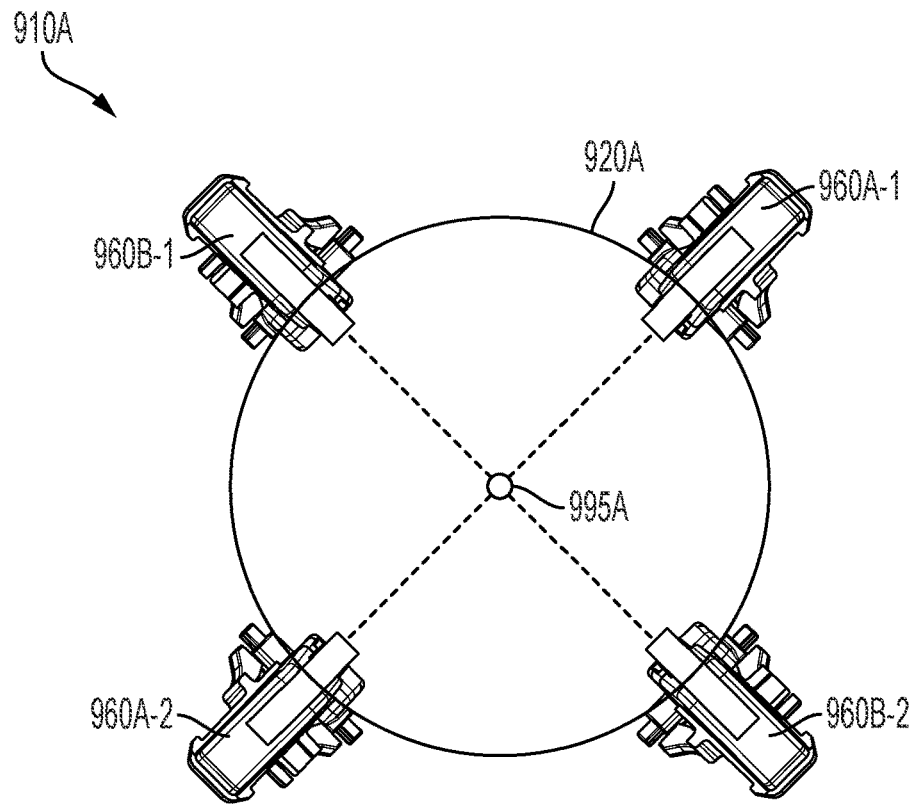
FIGS. 9A and 9B illustrates example layouts of one or more first tabs and one or more second tabs in the cup holder assembly according to certain aspects of the disclosure.
Figure 9B:
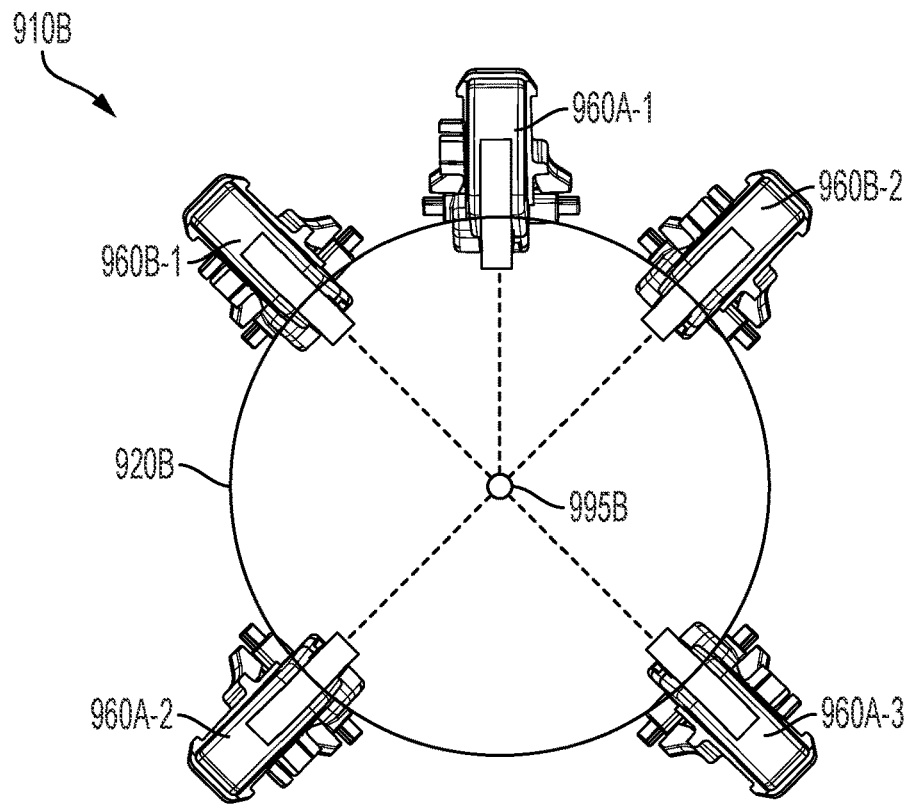

FIGS. 9A and 9B illustrates example layouts of one or more first tabs and one or more second tabs in the cup holder assembly according to certain aspects of the disclosure. Although the cup holder assemblies depicted in FIGS. 3 and 5A-8B include a single first tab and a single second tab located directly across from each other over the central axis of the cup holder for the simplicity of discussion, the numbers of the first tab and the second tab are not limited to one, but may be two or more. For example, the cup holder assembly may include two first tabs and two second tabs. Further, the number of the first tab may be different from the number of the second tab. For example, the cup holder assembly may include two first tabs and one second tab.

As illustrated in FIG. 9A, a cup holder assembly 910A includes two first tabs 960A-1 and 960A-2 and two second tabs 960B-1 and 960B-2. The two first tabs 960A-1 and 960A-2 have the same configuration as the first tab illustrated in FIGS. 3 and 5A-8B. The two second tabs 960B-1 and 960B-2 have the same configuration as the second tab illustrated in FIGS. 3 and 5A-8B.

The two first tabs 960A-1 and 960A-2 and the two second tabs 960B-1 and 960B-2 are evenly spaced (i.e., 90 degrees between two adjacent tabs) and alternately disposed on the outer surface of the cylindrical sidewall of the cup holder 920A. For example, the first tab 960A-1 is disposed 90 degrees away from the second tab 960B-1, the second tab 960B-1 is disposed 90 degrees away from the first tab 960A-2, the first tab 960A-2 is disposed 90 degrees away from the second tab 960B-2, and the second tab 960B-2 is disposed 90 degrees away from the first tab 960A-1. Thus, for example, two adjacent tabs include one first tab (e.g., first tab 960A-2) and one second tab (e.g., second tab 960B-1). In other words, the first tab 960A-1 is disposed directly across the central axis 995 from the first tab 960A-2. Similarly, the second tab 960B-1 is disposed directly across the central axis 995 from the second tab 960B-2.

As illustrated in FIG. 9B, a cup holder assembly 910B includes three first tabs 960A-1, 960A-2, and 960A-3 and two second tabs 960B-1 and 960B-2. The three first tabs 960A-1, 960A-2, and 960A-3 have the same configuration as the first tab illustrated in FIGS. 3 and 5A-8B. The two second tabs 960B-1 and 960B-2 have the same configuration as the second tab illustrated in FIGS. 3 and 5A-8B.

The three first tabs 960A-1, 960A-2, and 960A-3 and the two second tabs 960B-1 and 960B-2 disposed on the outer surface of the cylindrical sidewall of the cup holder 920A are not evenly spaced. For example, the first tab 960A-1 is disposed 45 degrees away from the second tab 960B-1, the second tab 960B-1 is disposed 90 degrees away from the first tab 960A-2, the first tab 960A-2 is disposed 90 degrees away from the first tab 960A-3, the first tab 960A-3 is disposed 90 degrees away from the second tab 960B-2, and the second tab 960B-2 is disposed 45 degrees away from the first tab 960A-1.

Further, the three first tabs 960A-1, 960A-2, and 960A-3 and the two second tabs 960B-1 and 960B-2 are not alternately disposed on the outer surface of the cylindrical sidewall of the cup holder 920A. Thus, two adjacent tabs may include a combination of one first tab (e.g., first tab 960A-2) and one second tab (e.g., second tab 960B-1) or a combination of one first tab (e.g., first tab 960A-2) and another first tab (e.g., first tab 960A-3).

FIGS. 3-8B were described using a cup holder assembly including one first tab (e.g., first tab 360A, 560A, 660A, 760A, and 860A), but the cup holder assembly may include two or more first tabs (e.g., first tab 960A-1, 960A-2, and 960A-3) as illustrated in FIGS. 9A and 9B. A case in which the cup holder assembly includes two or more first tabs will be described next.

In case the cup holder assembly includes two or more first tabs (e.g., first tab 960A-1, 960A-2, and 960A-3) as illustrated in FIGS. 9A and 9B, the sensor (e.g., sensor 380 in FIG. 3) and the actuator (e.g., actuator 390 in FIG. 3) may be provided to each of the two or more first tabs. The sensors provided to the two or more first tabs respectively measure pressures applied to the two or more first tabs, and transmit the measured pressures to the controller (e.g., controller 385 in FIG. 3). In some embodiments, one or more of the sensors may sense a non-zero pressure and another one of the sensors may sense a zero pressure. In some other embodiments, all of the sensors may sense a non-zero pressure or all of the sensors may sense a zero pressure.

Upon receiving the measured pressures from the sensors, the controller determines whether the measured pressures match one another. When the controller determines that the measured pressures do not match one another, the controller (e.g., controller 385 in FIG. 3) calculates an average pressure of the pressures received from the sensors provided to the respective two or more first tabs. The controller then converts the average pressure into an average retraction amount of the two or more first tabs by referring to the table stored in one or more computer readable media. The controller may control the actuators provided to the respective two or more first tabs such that each of the two or more first tabs retracts for the calculated average retraction amount from the cylindrical sidewall.

When the controller determines that the measured pressures match one another, the controller converts the measured pressures into a retraction amount of the two or more first tabs by referring to the table stored in one or more computer readable media.

In case the cup holder assembly includes two or more second tabs (e.g., second tab 960B-1 and 960B-2) as illustrated in FIGS. 9A and 9B, the sensor (e.g., sensor 380 in FIG. 3) and the actuator (e.g., actuator 390 in FIG. 3) may be provided to each of the two or more second tabs. Upon, the controller (e.g., controller 385 in FIG. 3) calculates a protraction amount of the two or more second tabs by subtracting the calculated average retraction amount or the calculated retraction amount of the two or more first tabs from the first tab maximum protraction amount. The controller controls the actuators to respectively move the two or more second tabs to move toward the central axis of the cup holder for the calculated protraction amount of the two or more second tabs.

In some embodiments, after the actuators completes moving the two or more second tabs for the calculated protraction amount of the two or more second tabs, the sensors of the two or more first tabs and the two or more second tabs may re-measure the pressures applied to the two or more first tabs and the two or more second tabs. The controller may repeat the process of controlling the actuators of the two or more first tabs and the two or more second tabs based on the re-measured pressures.

Figure 10A:
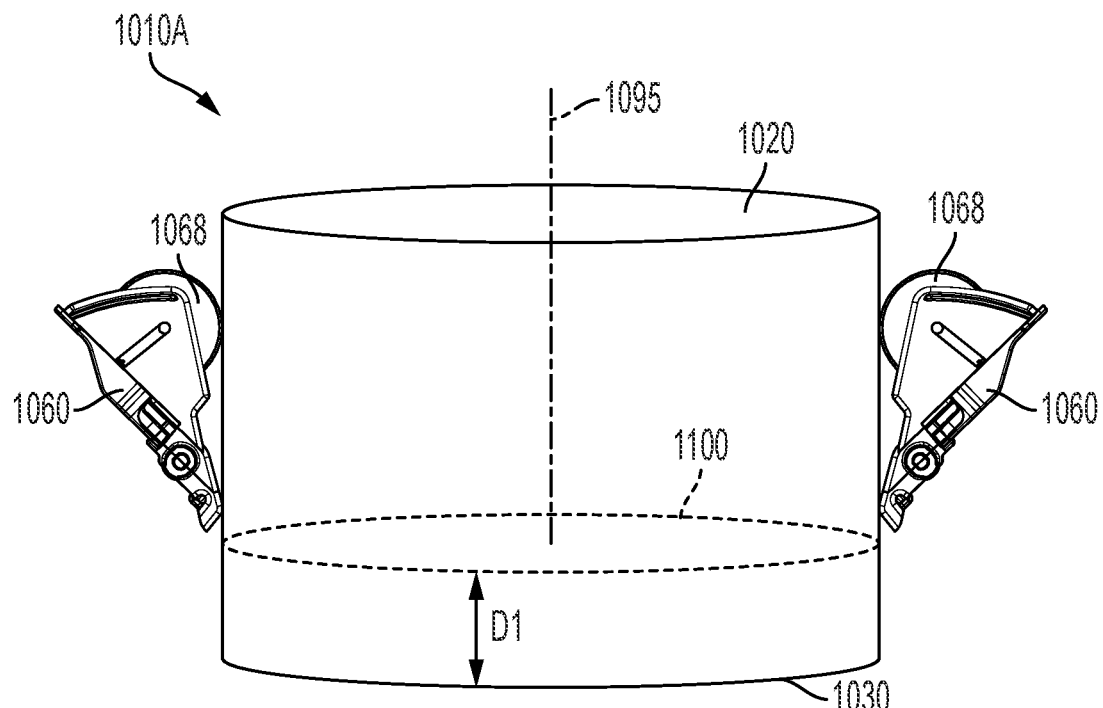
FIGS. 10A and 10B illustrate a cross-sectional view of an example cup holder assembly 1010 according to certain aspects of the disclosure.
Figure 10B:
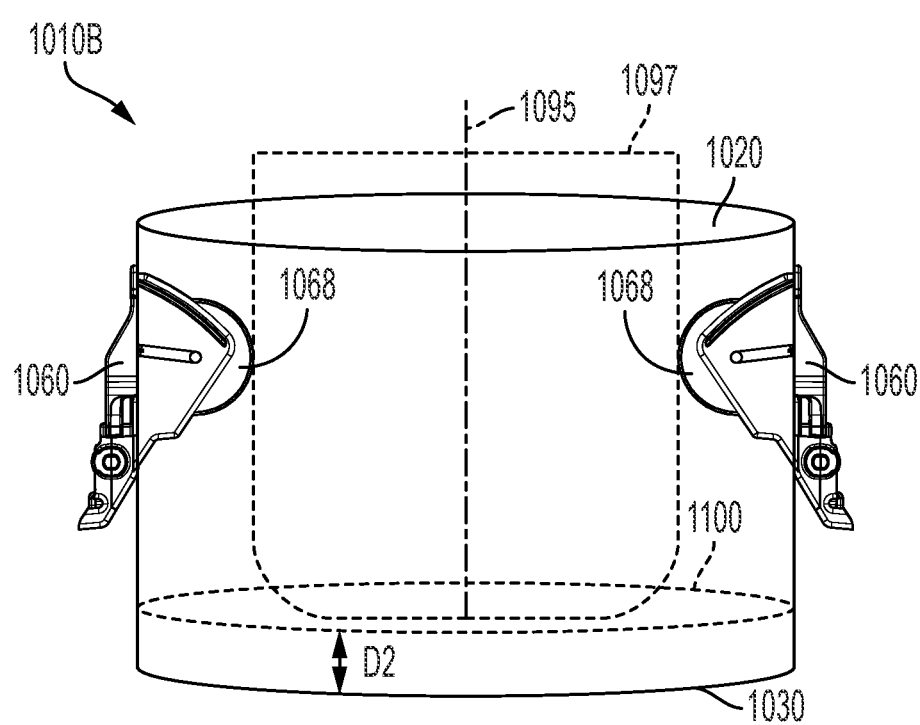

FIGS. 10A and 10B illustrate a cross-sectional view of an example cup holder assembly 1010 according to certain aspects of the disclosure. The cup holder assembly 1010 includes a cup holder 1020, tabs 1060, and an adjustable base 1100. The tabs 1080 each includes a wheel 1068. The number of the tabs 1080 is not limited to two, but the number of the tabs 1080 may be three or more.

As illustrated in FIG. 10A, when the cup holder 1020 is empty (no container), the entirety of both of the tabs 1060 and the wheels 1068 are disposed outside the cup holder 1020. The adjustable base 1100 is a first distance D1 away from a fixed base 1030 of the cup holder 1020.

As illustrated in FIG. 10B, when the cup holder 1020 receives a container 1097, the adjustable base 1100 moves toward the fixed base 1030 due to the weight of the container 1097 such that the adjustable base 1100 is a second distance D2 away from the fixed base 1030 of the cup holder 1020. The second distance D2 is shorter than the first distance D1.

Although not illustrated in FIGS. 10A and 10B, a sensor (e.g., sensor 380 in FIG. 3) is disposed between the adjustable base 1100 and the fixed base 1030. The sensor senses the pressure when the adjustable base 100 moves toward the fixed base 1030. The sensed pressure is transmitted to a controller (e.g., controller 385 in FIG. 3) (not illustrated in FIGS. 10A and 10B). The controller converts the pressure into a protraction amount of the tabs 1060. For example, the controller may refer to a conversion table stored in one or more computer readable media to convert the pressure into the protraction amount. The controller controls actuators (e.g., actuator 390 in FIG. 3) (not illustrated in FIGS. 10A and 10B) respectively provided to the tabs 1060 such that the actuators move the respective tabs 1060 toward the central axis 1095 of the cup holder 1020 for the protraction amount of the tabs 1060.

The configuration of the cup holder assembly 1010 allows the cup holder 1020 to be used for storing coins or other items (hand sanitizers, wallets, smartphones, key fobs, etc.) when no beverage container is inserted in the cup holder 1020. This allows the user to coins or the other items out of the cup holder 1020 without any part of the tabs 1060. When a beverage container is placed in the cup holder 1020, the tabs 1060 securely holds the beverage container in place reducing the rattling noise.

When pulling the container out of the cup holder 1020, the weight of the container 1097 on the adjustable base 1100 is reduced by the user lifting the container 1097 allowing the adjustable base 1100 to move away (e.g., move upward) from the fixed base 1030 facilitating the tabs 1060 to retract back outside the cup holder 1020. This allows the user to pull the container 1097 out of the cup holder 1020 with ease. In some embodiments, the pulling the container 1097 may roll the wheels 1068 upward. The wheels 1068 being rolled upward may trigger the adjustable base 1100 to move away from the fixed base 1030 triggering the tabs 1060 to retract and releasing the beverage container for easy takeout.

Many of the above-described features and applications are implemented as software processes that are specified as a set of instructions recorded on a computer readable storage medium (also referred to as computer readable medium). When these instructions are executed by one or more processors (e.g., one or more processors, cores of processors, or other processing units), they cause the processors to perform the actions indicated in the instructions. Examples of computer readable media include, but are not limited to, magnetic media, optical media, electronic media, etc. The computer readable media does not include carrier waves and electronic signals passing wirelessly or over wired connections.

In this specification, the term "software" is meant to include, for example, firmware residing in read-only memory or other form of electronic storage, or applications that may be stored in magnetic storage, optical, solid state, etc., which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Such electronic components are implemented by circuitry including, for example, one or more semiconductor integrated circuits. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra-density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself. ASICs and FPGAs are also implemented by semiconductor integrated circuits.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It may be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor may they be interpreted in such a way.

What is claimed is:

1. A cup holder comprising:
   a base;
   a cylindrical sidewall extending from the base, wherein the cylindrical sidewall comprises a first slit and a second slit;
   a first tab coupled to an outer surface of the cylindrical sidewall, wherein, when no pressure is applied to the first tab, the first tab is fully protracted into the cup holder via the first slit such that the first tab protracts into the cup holder for a first tab maximum protraction amount, and wherein, when a pressure is applied to the first tab due to the cup holder receiving a container, the first tab moves away from a central axis of the cup holder to retract out of the cup holder via the first slit;
   a second tab coupled to the outer surface of the cylindrical sidewall, wherein, when no force is applied to the first tab, the second tab is fully retracted out of the cup holder via the second slit such that an entirety of the second tab is outside the cup holder, and wherein, when the pressure is applied to the first tab, the second tab moves toward the central axis of the cup holder via the second slit;
   a sensor that measures the pressure applied to the first tab;
   a processor that i) converts the pressure applied to the first tab to a retraction amount of the first tab, and ii) calculates a protraction amount of the second tab by subtracting the retraction amount of the first tab from the first tab maximum protraction amount; and
   an actuator that controls the second tab to move toward the central axis of the cup holder for the calculated protraction amount of the second tab.

2. The cup holder of claim 1,
   wherein the first tab houses a first wheel, and
   wherein the second tab houses a second wheel.

3. The cup holder of claim 2, wherein, when no pressure is applied to the first tab:
   the first tab protracts into the cup holder via the first slit of the cylindrical sidewall for the first tab maximum protraction amount while the first wheel fully protrudes from a first opening of the first tab such that the first wheel protrudes for a maximum protrusion amount toward the central axis of the cup holder; and
   the second tab fully retracts out of the cup holder via the second slit of the cylindrical sidewall while the second wheel fully protrudes from a second opening of the second tab and is outside of the cup holder such that the second wheel protrudes for the maximum protrusion amount toward the central axis of the cup holder.

4. The cup holder of claim 3, wherein, when a first pressure greater than zero and less than or equal to a first threshold pressure is applied to the first tab:
   the first tab moves away from the central axis of the cup holder via the first slit while the first wheel fully protrudes from the first opening of the first tab such that the first wheel protrudes for the maximum protrusion amount toward the central axis of the cup holder;
   the processor i) converts the first pressure applied to the first tab to the first retraction amount of the first tab, ii) calculates a first protraction amount of the second tab by subtracting the first retraction amount of the first tab from the first tab maximum protraction amount, and iii) controls the actuator based on the calculated first protraction amount of the second tab; and
   the actuator moves the second tab such that the second tab protracts into the cup holder for the calculated first protraction amount of the second tab while the second wheel fully protrudes from the second opening of the second tab such that the second wheel protrudes for the maximum protrusion amount toward the central axis of the cup holder.

5. The cup holder of claim 4, wherein, when a second pressure greater than the first threshold pressure and less than or equal to a second threshold pressure greater than the first threshold pressure is applied to the first tab:
   the first tab moves away from the central axis of the cup holder for a first tab maximum retraction amount via the first slit such that a point of the first tab that is closest to the central axis of the cup holder becomes even with an inner surface of the cylindrical sidewall while the first wheel protrudes from the first opening of the first tab and the inner surface of the cylindrical sidewall for the maximum protrusion amount toward the central axis of the cup holder;
   controller i) converts the second pressure applied to the first tab to the first tab maximum retraction amount, and ii) calculates a second protraction amount of the second tab by subtracting the first tab maximum retraction amount of the first tab from the first tab maximum protraction amount; and
   the actuator controls the second tab to move toward the central axis of the cup holder for the calculated second protraction amount of the second tab such that a point of the second tab that is closest to the central axis of the cup holder becomes even with the inner surface of the cylindrical sidewall while the second wheel protrudes from the second opening of the second tab and the inner surface of the cylindrical sidewall for the maximum protrusion amount toward the central axis of the cup holder.

6. The cup holder of claim 5, wherein, when a third pressure greater than the second threshold pressure and less than or equal to a third threshold pressure greater than the second threshold pressure is applied to the first tab:
   the first tab moves away from the cup holder for the first tab maximum retraction amount via the first slit such that the point of the first tab that is closest to the central axis of the cup holder becomes even with the inner surface of the cylindrical sidewall while the first wheel protrudes from the first opening of the first tab and the inner surface of the cylindrical sidewall for a minimum protrusion amount toward the central axis of the cup holder, the minimum protrusion amount being greater than zero and less than the maximum protrusion amount;
   controller i) converts the third pressure applied to the first tab to the first tab maximum retraction amount, and ii) calculates a third protraction amount of the second tab by subtracting the first tab maximum retraction amount of the first tab from the first tab maximum protraction amount; and
   the actuator moves the second tab toward the central axis of the cup holder for the calculated third protraction amount of the second tab such that the point of the second tab that is closest to the central axis of the cup holder becomes even with the inner surface of the cylindrical sidewall while the second wheel protrudes from the second opening of the second tab and the inner surface of the cylindrical sidewall for the minimum protrusion amount toward the central axis of the cup holder.

7. A cup holder comprising:

a base;

a cylindrical sidewall extending from the base, wherein the cylindrical sidewall comprises two or more first slits and two or more second slits;

two or more first tabs each coupled to an outer surface of the cylindrical sidewall, wherein, when no pressure is applied to the two or more first tabs, each of the two or more first tabs is fully protracted into the cup holder via the first slit such that the first tab protracts into the cup holder for a first tab maximum protraction amount, and wherein, when a pressure is applied to at least one of the two or more first tabs due to the cup holder receiving a container, the at least one of the two or more first tabs moves away from a central axis of the cup holder to retract out of the cup holder via the first slit;

two or more second tabs each coupled to the outer surface of the cylindrical sidewall, wherein, when no pressure is applied to the two or more first tabs, each of the two or more second tabs is fully retracted out of the cup holder via the second slit such that an entirety of the second tab is outside the cup holder, and wherein, when the pressure is applied to the at least one of the two or more first tabs, each of the two or more second tabs moves toward the central axis of the cup holder via the second slit;

two or more sensors respectively provided to the two or more first tabs;

controller that i) calculates an average pressure of the pressures of the two or more first tabs, ii) converts the calculated average pressure into an average retraction amount of the two or more first tabs, and iii) calculates a protraction amount of the two or more second tabs by subtracting the calculated average retraction amount of the two or more first tabs from the first tab maximum protraction amount;

two or more first actuators respectively provided to the two or more first tabs, wherein the two or more first actuators respectively move the two or more first tabs such that each of the two or more first tabs retracts for the calculated average retraction amount from the cylindrical sidewall; and two or more second actuators respectively provided to the two or more second tabs, wherein the two or more second actuators respectively move the two or more second tabs toward a central axis of the cup holder for the calculated protraction amount of the two or more second tabs.

* * * * *